United States Patent
Bickel, Jr. et al.

(10) Patent No.: US 8,678,178 B2
(45) Date of Patent: Mar. 25, 2014

(54) MODULAR CONVEYOR BELT WITH TIGHT RADIUS IN ONE CURVE DIRECTION

(75) Inventors: William J. Bickel, Jr., Midwest City, OK (US); Jeffrey Earl Delair, Leesport, PA (US)

(73) Assignee: Habasit AG, Reinach-Basel (CH)

( * ) Notice: Subject to any disclaimer, the term of this patent is extended or adjusted under 35 U.S.C. 154(b) by 1399 days.

(21) Appl. No.: 11/343,978

(22) Filed: Jan. 30, 2006

(65) Prior Publication Data

US 2007/0175736 A1    Aug. 2, 2007

(51) Int. Cl.
*B65G 17/08* (2006.01)

(52) U.S. Cl.
USPC ............................. 198/778; 198/853

(58) Field of Classification Search
USPC .................... 198/851, 852, 778, 853
See application file for complete search history.

(56) References Cited

U.S. PATENT DOCUMENTS

| | | | |
|---|---|---|---|
| 4,276,980 A | 7/1981 | Oizumi | |
| 4,901,844 A | 2/1990 | Palmaer et al. | |
| 4,993,544 A | 2/1991 | Bailey et al. | |
| 5,181,601 A | 1/1993 | Palmaer et al. | |
| 5,217,110 A * | 6/1993 | Spangler et al. | 198/852 |
| 5,310,045 A | 5/1994 | Palmaer et al. | |
| 5,346,059 A * | 9/1994 | Irwin | 198/852 |
| 5,645,160 A * | 7/1997 | Palmaer et al. | 198/853 |
| 5,906,270 A * | 5/1999 | Faulkner | 198/853 |
| 5,908,270 A * | 6/1999 | Araki | 408/1 R |
| 5,921,379 A | 7/1999 | Horton | |
| 6,073,756 A * | 6/2000 | Damkjær et al. | 198/853 |
| 6,216,854 B1 | 4/2001 | Damkjær et al. | |
| 6,357,581 B1 * | 3/2002 | Guldenfels | 198/853 |
| 6,382,405 B1 | 5/2002 | Palmaer | |
| 6,484,379 B2 * | 11/2002 | Palmaer | 29/401.1 |
| 6,672,451 B1 * | 1/2004 | Thompson et al. | 198/853 |
| 6,837,367 B1 | 1/2005 | Klein et al. | |
| 2001/0042677 A1 * | 11/2001 | Palmaer | 198/853 |
| 2003/0192777 A1 * | 10/2003 | Guldenfels | 198/853 |
| 2004/0007448 A1 * | 1/2004 | Cediel et al. | 198/851 |
| 2005/0109589 A1 * | 5/2005 | Guldenfels | 198/853 |
| 2005/0183936 A1 | 8/2005 | Neely et al. | |

FOREIGN PATENT DOCUMENTS

| | | |
|---|---|---|
| EP | 1306323 | 5/2003 |
| WO | WO0043299 | 7/2000 |
| WO | WO2005028341 | 3/2005 |

* cited by examiner

*Primary Examiner* — Kavel Singh
(74) *Attorney, Agent, or Firm* — Thomas M. Freiburger (57) ABSTRACT

A modular plastic conveyor belt is designed to turn a tight radius in one direction only. Particularly it is designed for use as a spiral conveyor belt, the belt can turn in the opposite direction, but with a much larger radius. At the outer edge of the belt, the link ends or knuckles are larger and heavier for increased strength in accepting tension at the outer edge of the belt. The outside knuckles or link ends are not only wider than at the inside, but they also are longer, with increased material beyond the rod opening for increased tension strength. By having wider link members at the inner edge, the belt can collapse more closely at the inner edge than would be possible if the turn were in the other direction, providing a tighter radius of turn. This is useful in spiral conveyors which ordinarily turn in only one direction through the entire path of travel.

15 Claims, 6 Drawing Sheets

MODULAR CONVEYOR BELT WITH TIGHT RADIUS IN ONE CURVE DIRECTION

BACKGROUND OF THE INVENTION

This invention concerns modular plastic conveyor belts and the integrally molded modules which are assembled together, usually by connecting rods or pins, to form such modular belts. Specifically the invention is concerned with such a modular belt. that travels around curves (known as a radius belt) and is well adapted for use on spiral (helical) conveyor belt systems.

Conveyor belts of the general type addressed by this invention are shown in U.S. Pat. Nos. 4,901,844, 5,181,601, 5,310,045 and 6,484,379. Modular belt design, for relatively tight turns in radius belts, focuses on tight nesting together at the belt's inner edge, tight turn ratio, adequate beam strength to support items carried on the belt, adequate tension strength in the belt (both in turning and straight travel), air flow through the belt, and minimizing belt chatter at the inner edge on a spiral, edge-driven belt. Previous belts have not exhibited the efficient design of the present invention, particularly for spiral system application.

The following patents have some relevance to the subject matter of the present invention: U.S. Pat. Nos. 4,276,980, 4993,544, 5,217,110, 5,346,059, 5,645,160, 5,906,270, 5,921,379 and 6,216,854.

SUMMARY OF THE INVENTION

In the modular radius conveyor belt of this invention, the belt modules are configured so as to permit a tighter turning radius in one direction of curvature than in the opposite direction. By this design, the inner edge of the belt is allowed to collapse more closely, with less bulky link ends at or near the inner edge, so that the link ends at that inner edge can nest together as tightly as possible, with the connecting rod closely adjacent to the spine of an adjacent module in the collapsed configuration. At the same time, the outer edge has large, beefier link ends, with greater width and deeper plastic material beyond the rod apertures of the link ends, since the belt need not turn with a tight radius in the opposite direction of turning. In other words, the belt is efficiently designed to sacrifice tight turning in the opposite curve direction, in order to provide closer, tighter turning in the primary direction, and this is done by radically different design configurations at the two ends of the belt. These two ends can be on a single module, for a belt with only one module per row, or can be on the edges of end modules, with two, three or more modules making up the width of a belt row.

The belt's tight one-direction turning construction does not inhibit its ability to travel in a straight line when needed. Spiral belts normally have straight travel paths between the points where the belt departs the spiral tower and where it re-enters the tower. The modules and link end configurations provide for straight travel with succeeding module rows parallel.

The belt rows in preferred embodiments include special wide edge members at inside and outside edges. At the inner edge the special edge member, which is an integral part of the inner module, has bulk which alleviates or minimizes chatter as the belt is driven by contact with this edge member, provides for connecting rod retention, and provides a mounting for side guards when needed. In addition, this edge member enables assembly of radius-adjusting plugs as needed, pursuant to the system disclosed in the above-referenced U.S. Pat. No. 6,484,379. The inner edge member does not interfere with tight collapse of the belt.

At the outer edge of the belt the special wide edge member provides strength for withstanding tension at the outside of the curve, and it is among other beefy link ends at that edge that are not present at the inner edge. Deeper plastic material exists beyond the rod apertures in this region.

Also at the outer edge of the belt, a bulky link end, the last link end in one of the aligned series of link ends, is offset in position relative to the two link ends between which it interdigits in the adjacent module row. By offsetting this bulky link end toward the inner side of the curving belt, sufficient clearance is provided that the belt can assume its tightest radius position (maximum collapse at the inner edge with full tension at the outer edge), without binding by. interference with the wall of a link end on such adjacent module.

Another feature of the belt of the invention is that the center spine of the module row, i.e. the laterally extending central member from which link ends extend both forward and rear, is uneven in its geometry .from inside edge to outside edge. The center spine is thinner in material at the inner edge, such that as close as possible nesting is possible at the inner edge, but it becomes thicker toward the outer side of the belt, in areas remote from the inner edge. This provides greater beam strength to support the weight of products on the belt surface. In every region other than the inner edge and at the link ends very near this inner edge, the need to minimize the thickness of the center spine does not apply, because this will not be a limiting factor in tight collapse of the belt in the primary curvature action.

Throughout the center of the belt's module row, the link ends are thin and relatively close together, with bulkier link ends, in both width and beyond-aperture thickness, occurring only at the outer edge.

In one preferred embodiment of the invention, the invention comprises a modular plastic conveyor belt assembled from a multiplicity of plastic modules in module rows each made up of one or more modules, the belt adapted to travel in a direction generally perpendicular to the module rows, and each module having a series of first link ends or knuckles and a series of second link ends or knuckles, the first and second link ends extending in opposite directions from one another from the central spine of the belt. The link ends have apertures, with the apertures of a series of link ends aligned to receive a connecting rod or pin extending through apertures of first link ends of one module row and second link ends of an adjacent module row when the link ends of the two module rows are interdigited in overlapping relationship. Apertures of the first link ends are elongated slots to allow radius belt travel, while apertures of the second link ends may be circular. The invention provides a construction that allows a tighter turning radius in one direction of curvature than in an opposite direction of curvature, in an efficient design in which link ends near the inner edge of the module row curving in one direction are thinner in plastic material, with less thickness beyond the aperture in one or more link ends near that inner edge as compared to the link ends at the outer edge of the module row. In this way, the module rows at the inner edge can collapse and nest together more closely than at the outer edge, while the link ends in the module rows are configured also to allow straight belt travel without angularity between adjacent rows.

It is thus among the objects of the invention to improve on radius modular plastic conveyor belt design, particularly for belts adapted to serve in spiral belt systems, by providing an imbalanced geometry between the two ends of a module row, sacrificing tightness of curvature in a secondary direction of curvature while maximizing tight nesting together at the inner edge in a primary direction of curvature, resulting in an efficient, relatively tight-radius conveyor belt. These and other objects, advantages and features of the invention will be apparent from the following description of preferred embodiments, considered along with the drawings.

DESCRIPTION OF PREFERRED EMBODIMENTS

The drawings show in FIGS. 1-4 a portion of a modular plastic radius conveyor belt 10. The section of belt is shown on a curve in the primary curve direction, with the inside 12 of the belt nearly fully collapsed. At the inside edge are special inner edge link ends or knuckles 14, each which has an opening for a connecting rod 16, each such aperture being in line with the apertures of a large number of center link ends or knuckles 18 in a first set of link ends on each module 20. The link ends 18, called herein center link ends, are narrow and relatively closely spaced together, as shown in the drawing. Just to the inside of those center link ends is a wider, heavier link end 22, then the special wide edge link end 14 at the extreme inner edge, as shown in the drawing. At the outer side are a thicker, wider and heavier link end 24 and a special outer edge link end 26, which may be similar in most respects to the inner edge special link end 14. All of these link ends form a group of link ends which extend in one direction of travel of the belt, herein denoted as first link ends, but not to indicate any particular direction of travel, since the belt could travel in either direction.

Figure 1:
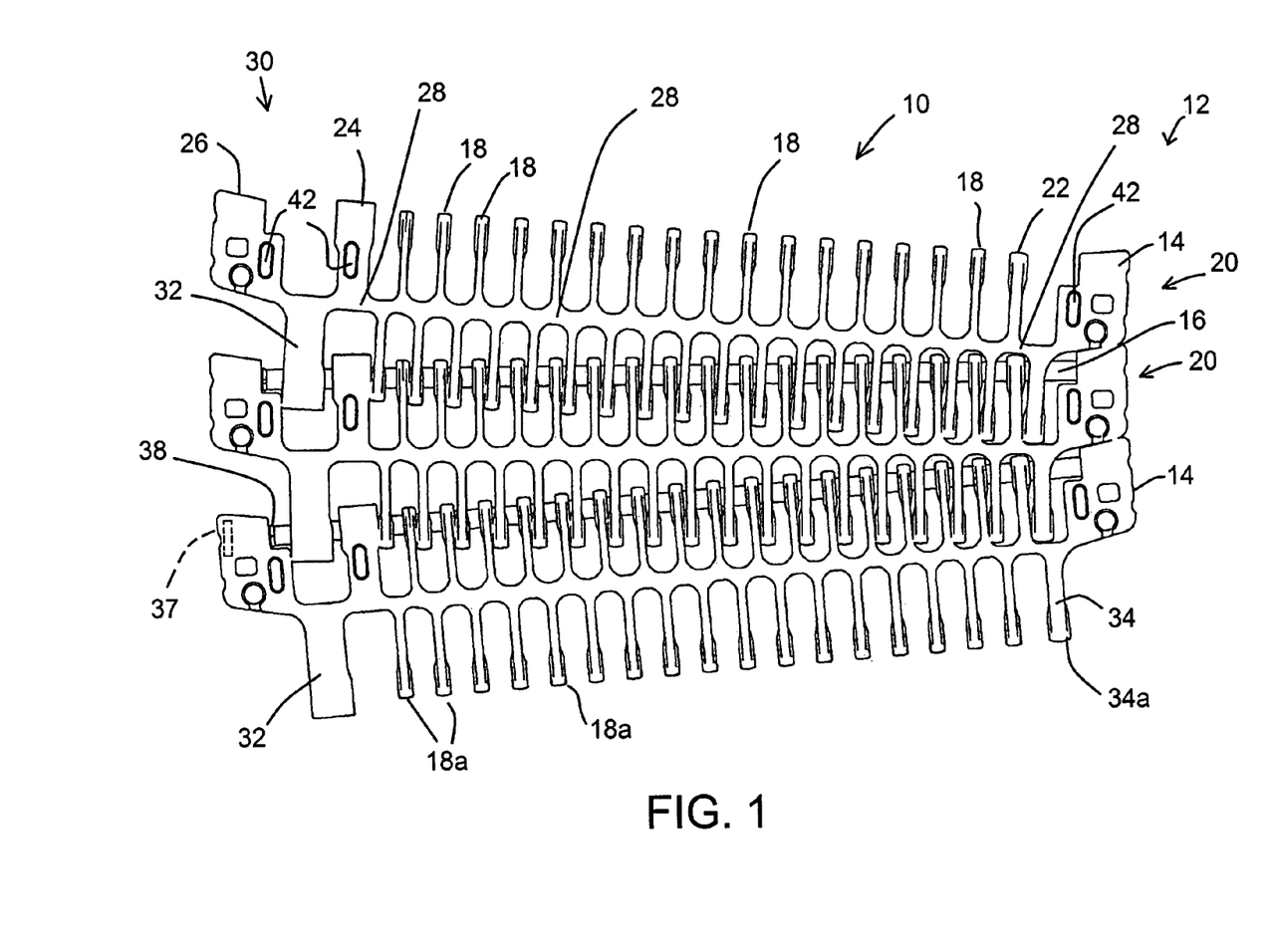
FIG. 1 is a plan view showing a modular conveyor belt of the invention, each module row comprising a single module in this embodiment, shown in curving travel.

All of these first link ends extend from a central spine 28 of the module 20, and this spine has a specific construction pursuant to the invention. As shown in the drawing, the spine 28 is thinner near the inside edge 12 but thicker in regions remote from the inside edge. It is only important that the spine be thin near the inside edge for the primary direction of travel, because at that edge close nesting together in collapse of that edge is critical for achieving a tight turn radius. Turning radius or turning ratio as used herein and in the industry is defined as the distance from the inside edge of the belt to the center of turning, divided by the width of the belt. In the belt illustrated, a turning radius of about 1.6 or tighter can be achieved.

At and near the outside edge 30 of the belt as defined by the primary direction of curvature, the link ends or knuckles are large and beefy in order to withstand the tension at the outer edge of the curve. These knuckles or link ends are not only wider than the center link ends but also have thicker plastic material beyond the apertures. This is true of the link end 24 of the first set of link ends, and of an oppositely-extending link end 32 of a second set of link ends that extend in an opposite direction from the spine, as compared to the first link ends 26, 24, 18, 22 and 14. The special outer edge link end 26 is also a heavy link end, but it may be very similar to the inner special link end 14, which is a special case at the inner edge end which need not be especially thin beyond the aperture because of the angled shape of these link ends 14 as shown in the drawing.

The second set of link ends also includes relatively thin link ends designated as center link ends 18a, as shown, and a heavier inner second link end 34, wider than the center link ends but preferably still with a thin region of plastic material at the tip 34a, beyond the aperture.

Since this is a radius conveyor belt, one set of link ends must have slotted apertures. In the illustrated construction it is the second link ends 32, 18a and 34 that have slots. The slots 36, which are not readily visible in FIG. 1 but can be seen in FIG. 4, preferably extend essentially the full length of the second link ends, to accommodate maximum possible collapse at the inner edge of a curve.

The outer second link ends 32 are sometimes referred to herein as the outside link end or knuckle of the second set of link ends, and the link end 24 of the first set of link ends in the module and of the module row is sometimes referred to as the outside link end of the first set, even though the special edge link end or knuckle 26 is actually at the edge of the row. Similarly, at the inside 12, the link end 34 of the second set is sometimes referred to as the inside link end of that set, and the link end 22 in the opposite direction is sometimes referred to as the inside link end of the first set of link ends.

The special edge knuckles 14 and 26, both in the first set of link ends, serve several functions. They avoid or minimize belt chatter at the inner edge when driven by a driving gauge in a spiral system. Further, they provide an appropriate edge for engagement with driving, as by vertical bars of a driving cage. Another function is that they provide for retention of the connecting rod or pin 16. In one preferred embodiment a rod head 37 is seated in a recess at one side of the belt (shown as the outside). At the same side of the belt but the opposite side of the special edge knuckle 26 is a retention ring 38 integrally formed on the rod, seen at the left side of FIG. 1. The rod is thus held against escape in either direction, and at the other edge of the belt the rod can be generally flush with the edge. If desired, other types of rod retention can be used.

Figure 3:
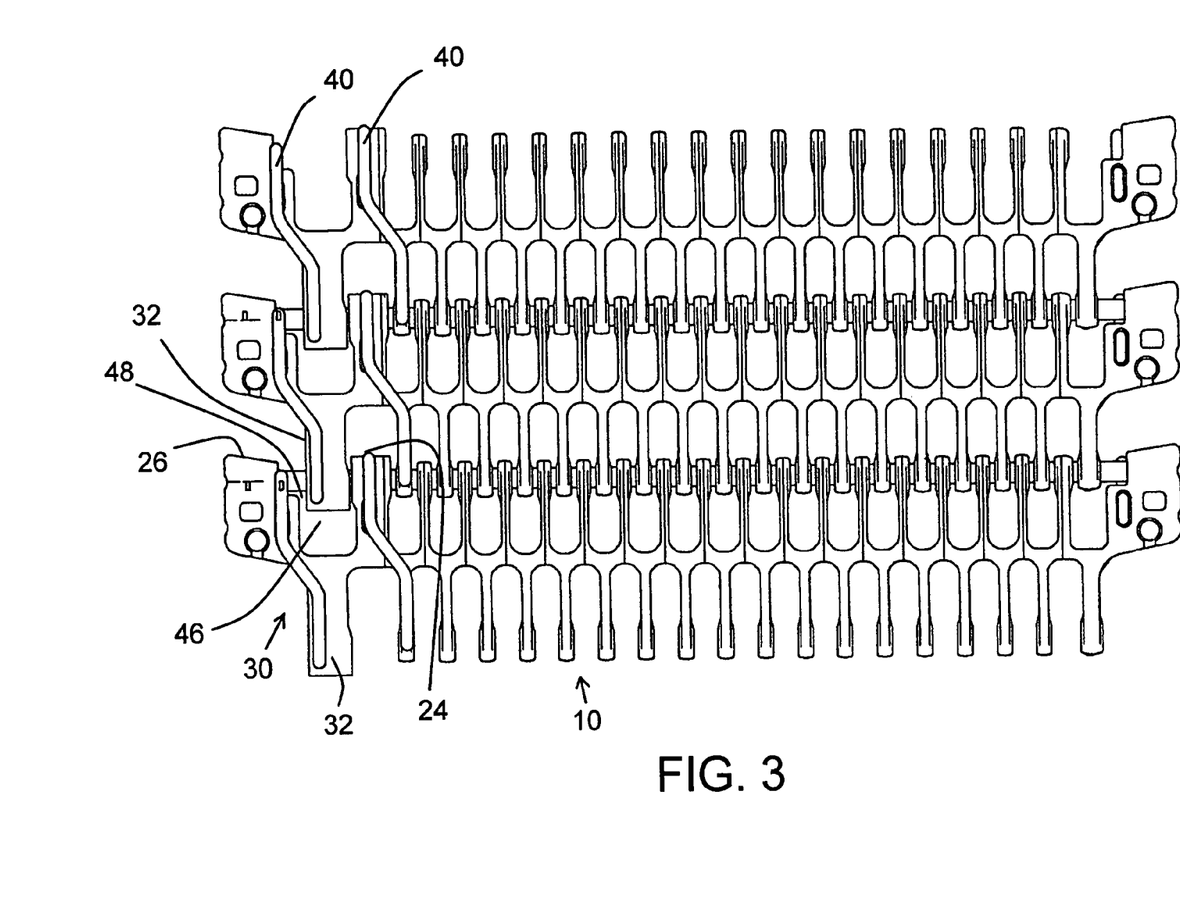
FIG. 3 is a plan view showing a portion of the belt in straight travel, with the module rows parallel.

A further function of these special edge link ends 14 and 26 is to provide mounting for snap-in side guards 40, which are shown on the belt in FIG. 3. As shown in that drawing, the side guards can be located in any of several places at the outer side 30 of the belt, with side guard mounting holes 42 at two locations at the outer side and at one location at the inner side 12, as shown in FIG. 1. Finally, the special edge knuckles 14 and 26 also provide a connection for radius limit plugs, as are disclosed in U.S. Pat. No. 6,484,379 referenced above.

Figure 2:
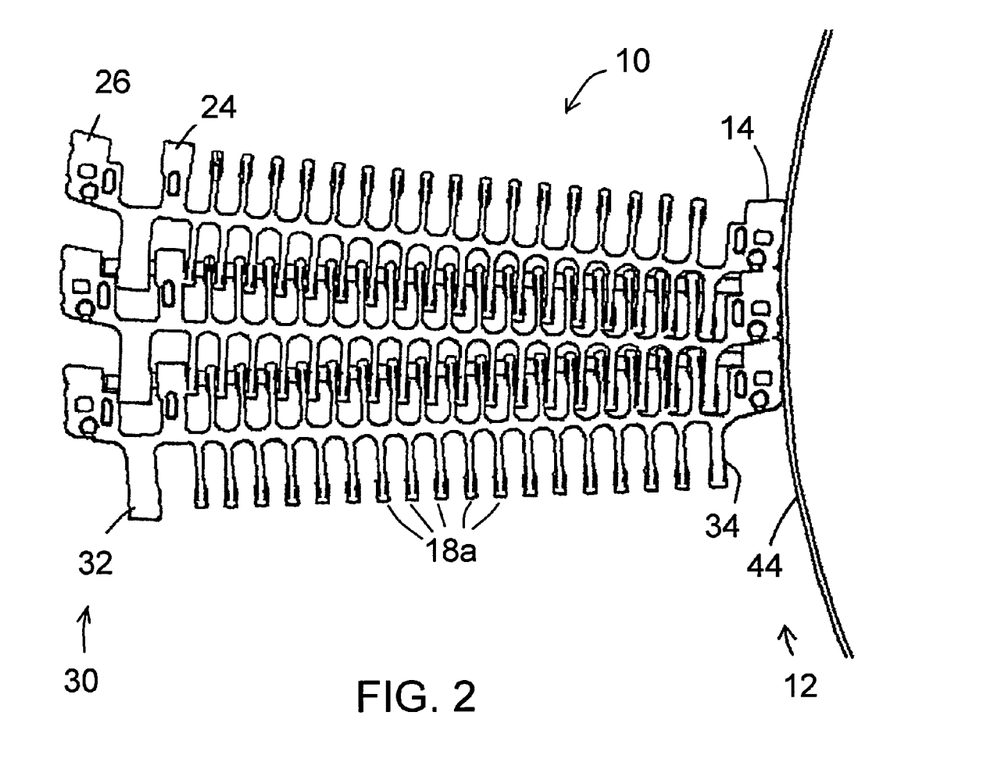
FIG. 2 is another plan view showing the modular conveyor belt of FIG. 1 and indicating the belt being driven by a driving tower in a spiral conveyor belt system.

FIG. 2 shows the belt of FIG. 1 as a relatively narrow belt made up of a single module in each row, and driven by a driving gauge 44 that is schematically indicated. Normally the belt will be driven in the up direction as viewed in FIG. 2, but it could be driven in the opposite direction if desired.

Figure 4:
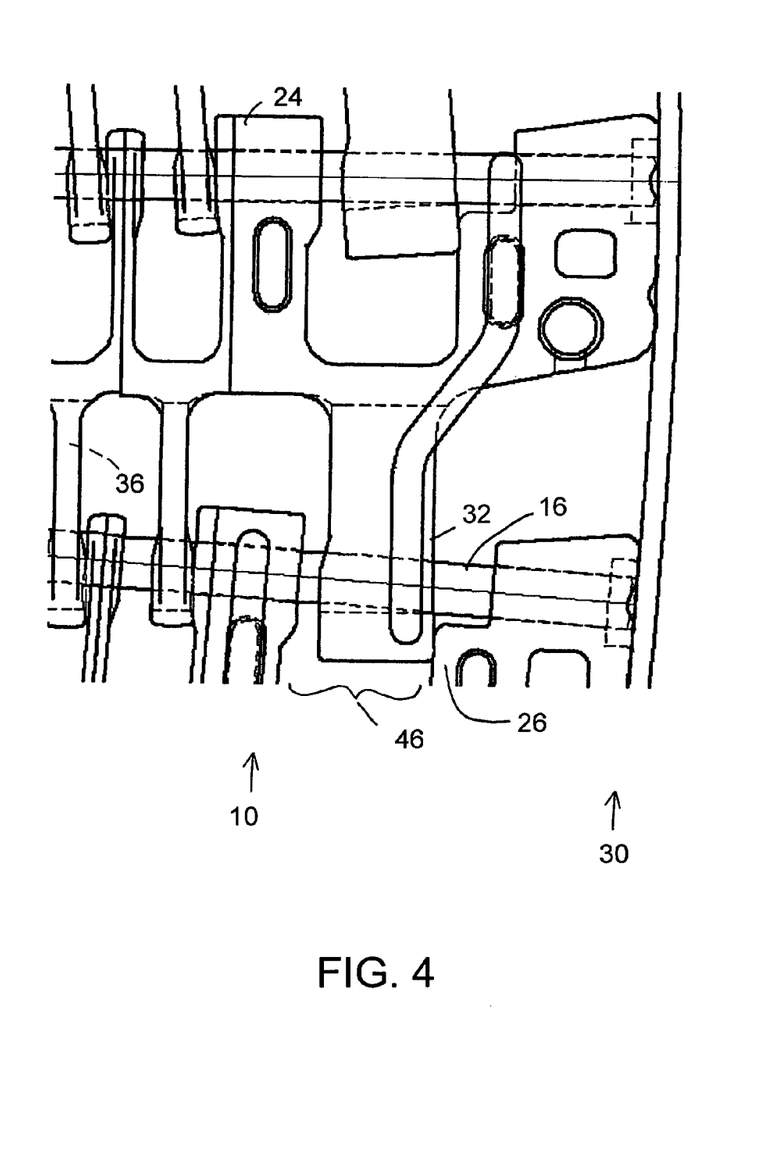
FIG. 4 is a detail view in plan, illustrating a feature of the belt of the invention.

The drawings, particularly FIGS. 3 and 4, show a feature of the belt at the outside edge 30. In straight travel as indicated for the belt section 10 in FIG. 3, the large outer knuckle 32 of the second set of link ends is offset in the space 46 between the first set knuckles 26 and 24 that receives the knuckle 32. The module is fabricated in such a way that this space 46 is wider than the end of the knuckle 32 and such that, when all center knuckles are interdigited closely and properly as shown, this knuckle 32 will be against (in contact or almost in contact with) the knuckle 24 of the adjacent module row. A small space, which may be about 0.035", is seen at 48. When the belt goes into full curve, however, as shown in FIG. 4, the angularity between the modules for the relatively tight radius described, causes the second set module 32 to angle over to the right side of the space 46 as viewed in FIG. 4. This puts the knuckle 32 in contact with or virtually in contact with a surface of the link end or knuckle 26, as shown in FIG. 4. The offset is needed, as shown during straight travel, in order to accommodate this angularity and to prevent binding.

Figure 5:
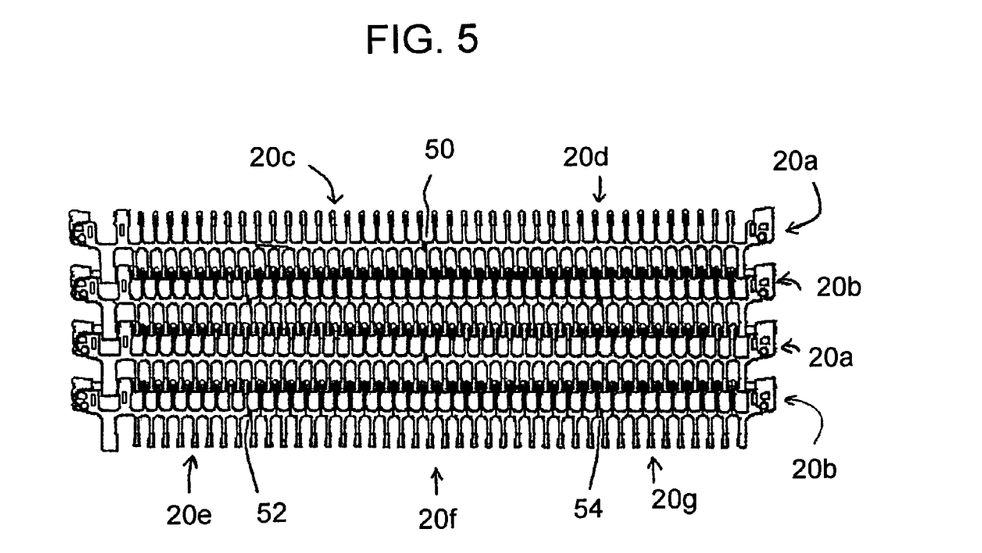
FIG. 5 is a plan view showing a portion of a conveyor belt in another embodiment, illustrating that the belt in each module row can be made up of several belt modules side by side.

FIG. 5 shows the same type of belt as FIGS. 1-4, but in an embodiment wherein each module row 20*a* and 20*b* comprises a plurality of belt modules. Here, the module rows 20*a* have two modules 20*c* and 20*d*, and a division can be seen at 50. The module rows 20*b* have three modules in each row, seen at 20*e*, 20*f* and 20*g*, with division lines 52 and 54 visible in FIG. 5. A similar turning radius can be achieved to that described for FIG. 1; the angularity between adjacent module rows becomes less with greater belt width, but the denominator of the ratio that defines the turning radius becomes larger.

Figure 6:
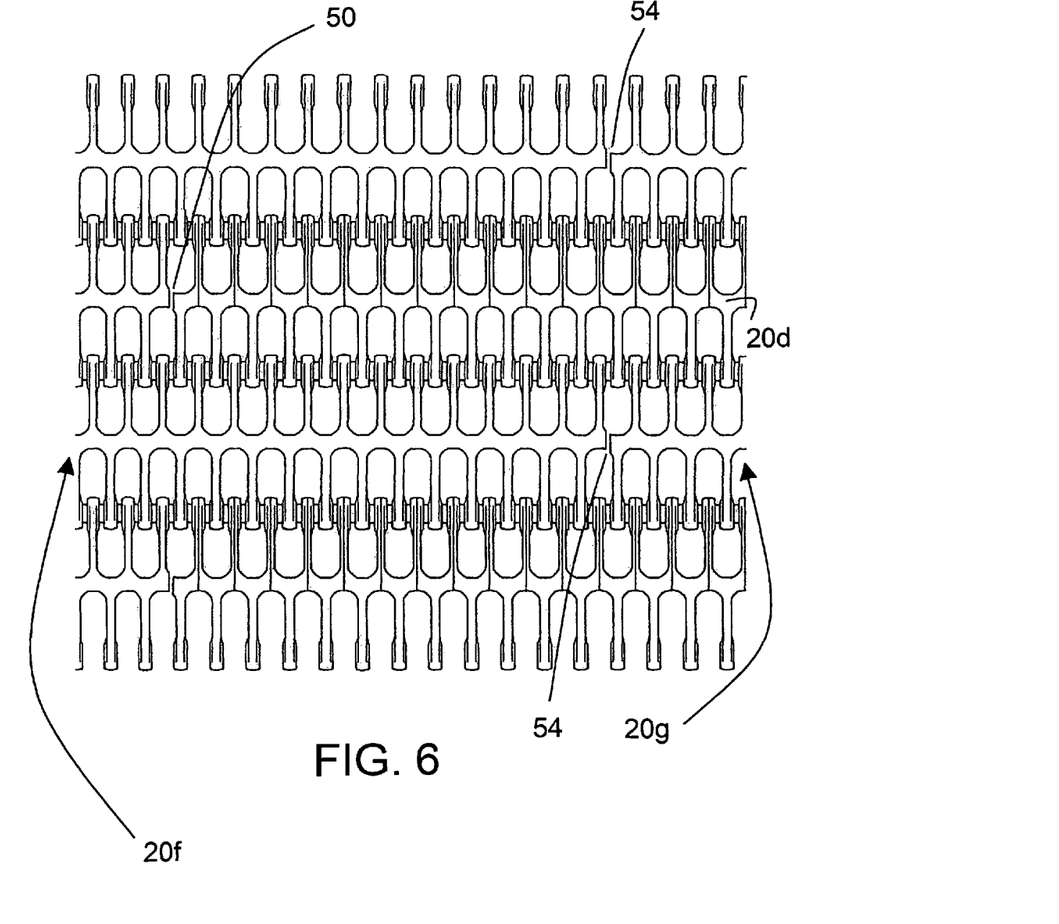
FIG. 6 is a detail view of the belt showing a portion of the belt of FIG. 5.

FIG. 6 is an enlarged view of a portion of FIG. 5, showing parts of the module rows and the divisions between modules in the rows.

Figure 7:
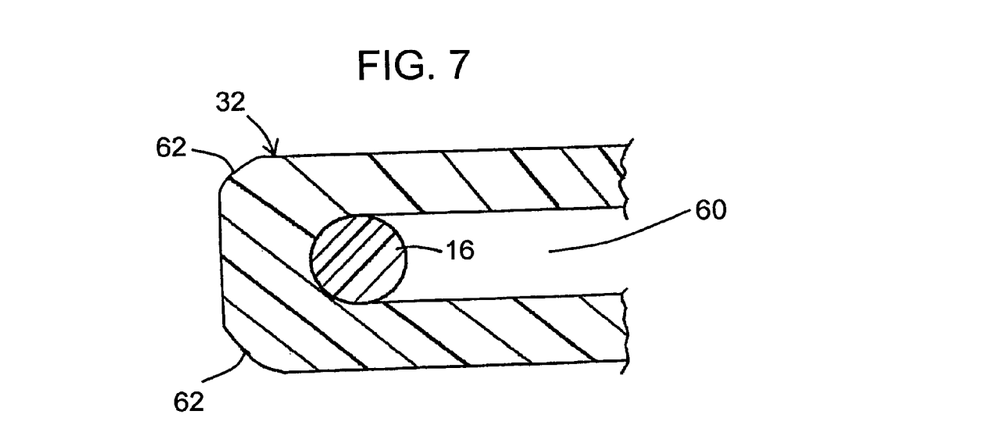
FIG. 7 is an enlarged elevational cross section showing a part of a special link or a knuckle.

With the configuration of the invention as described above, high tension at the outside of a curve in the primary direction of curvature of the belt is resisted by heavier, deeper link ends or knuckles. A typical point of failure, if overload occurs, is at an outside knuckle at the position of the knuckle 32, or at the connecting rod in that location. The invention addresses this weakness by providing a deep and wide knuckle 32. FIGS. 1, 3 and 4 in particular show this extra depth of the knuckle beyond the rod or pin 16. FIG. 7 shows one of these heavy knuckles 32 in cross section; the heavy knuckles 24 are similar but with a hole rather than the slot 60 shown. The knuckle is thick beyond the rod 16 and is essentially "squared" in shape except for rounded corners at 62. The squared shape puts a large cross section of plastic in front of the rod and provides a continuous large cross section in a U shape around the rod, to maximize strength. When the belt is in a radius this higher strength is particularly important. The rod is in a different angle than that of the knuckle. This causes the rod to contact only the outside corner of this knuckle which somewhat point loads the knuckle. If the knuckle were rounded like other knuckles on this belt or on other belt designs, the load would be focused on the thinnest area in front of the rod. This could cause the knuckle to "rip" open from the thinnest point to the thickest. By having the knuckle square and-only turning a tight radius in one direction, the added material can be provided in front of the rod, and at the same thickness on the entire width of the knuckle. This gives increased strength and good resistance to ripping. Depending on the rod material used, the point loading and ripping changes. With a flexible rod, the rod flexes to share the load among more of the square knuckle and, depending on the width of the belt, rod material and turn radius, it could spread the load across several knuckles.

Since the belt turns a tight radius only in one direction, the heavy, square load bearing knuckles are only needed on the outside end. The rest of the belt is mainly for product support. Because the middle and the inside of the belt sees no load (other than product weight) when the belt is in a radius, the knuckles and spine in these areas can be thinned out to increase the airflow through the belt and allow the belt to turn a tighter turn radius with tighter collapse at the inner side.

Other plastic radius belts can turn a design radius in either direction, so the strength of the belt has to be designed into both ends of the belt. This adds material to both ends and when the belt is in a radius, airflow or turn radius is compromised. Many of these belts are used in freezers where cold air is blown through the belt from the bottom to the top. Belts that turn a tight turn radius that have good strength sacrifice airflow through the inside one third to one half of the belt. This reduces the effective area of the belt.

The invention achieves an efficient radius belt design, particularly for a tight turning radius on a spiral conveyor belt, through the different design of the inner and outer sides of the modular belt, sacrificing a tight turning radius for the non-primary curve direction in favor of tight nesting at the inside of the curve in the primary curve direction. On average, less plastic material is required for the module, for a given design strength, than in other radius belt designs.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a modular plastic conveyor belt assembled from a multiplicity of plastic modules in module rows each made up of one or more modules, the belt adapted to travel in a direction generally perpendicular to the module rows, each module having a series of first link ends or knuckles and a series of second link ends or knuckles, the first and second link ends extending in opposite directions from one another and generally perpendicular to the width of the module rows, the link ends each having an aperture, with the apertures of a series of link ends aligned to receive a connecting rod extending through apertures of first link ends of one module row and second link ends of an adjacent module row when the link ends of the two module rows are interdigited in overlapping relationship, and the apertures of the second link ends being elongated slots to allow radius belt travel, link ends nearer an inner edge of the module row relative to said one direction of curvature being thinner in plastic material in said direction generally perpendicular to the width of the module rows, with less thickness of plastic material beyond the aperture, between the aperture and a link end tip, in one or more link ends near said inner edge as compared to the link ends at the outer edge of the module row, such that the module rows at said inner edge can collapse and nest together more closely than at the outer edge, while the link ends in the module rows are configured also to allow straight belt travel without angularity between adjacent module rows; and wherein said link ends of both said first link ends and said second link ends at the outer edge relative to said one direction of curvature are relatively heavier link ends, both wider and with greater depth of plastic material beyond the aperture as compared to said link ends nearer the inner edge, to provide greater strength at the outside of the curve.

2. A modular conveyor belt as in claim 1, wherein each module includes a center spine from which the link ends extend, and the center spine adjacent to the inner edge in each module row being thinner from front to back than in portions of the spine remote from the inner edge, to allow the inner edge of the belt to collapse and nest together more closely at the inner edge.

3. A modular conveyor belt as in claim 1, wherein each module comprises a center spine extending widthwise of the belt, and said link ends or knuckles extending fore and aft from the spine, and wherein the spine in a portion close to said inner edge of the belt in each row has thickness fore to aft which is thinner than in a thicker spine portion of the module row remote from the inner edge of the belt, thereby to provide for tighter collapse at the inside edge of the belt while providing for greater vertical load-bearing beam strength of the modules in regions remote from the inside edge.

4. A modular conveyor belt as in claim 3, wherein the belt has only one module per module row, the module including both inside and outside edges of the belt.

5. A modular conveyor belt as in claim 3, wherein at least some of the module rows include a plurality of modules side by side.

6. A modular conveyor belt as in claim 1, wherein at least one link end or knuckle near the inner edge is substantially thinner than an outer knuckle or link end, and thin relative to a space laterally between link ends in the adjacent module row in which said one link end is interdigited, so as to promote air flow in a generally vertical direction through the belt near the inside of the belt.

7. A modular conveyor belt as in claim 6, wherein center link ends between said outer link ends at the outer edge and an inner link end at said inside edge are thinner and spaced more closely together than said outer and inner link ends for good product support and to promote air flow through the belt.

8. A modular conveyor belt as in claim 1, wherein the inside edge of the belt has a special edge member or link end which is larger, wider and more rigid than center link ends between said outer link ends at the outer edge and said inner link ends at said inside edge so as to reduce belt chatter at the inside edge as the belt travels around a spiral path driven by a driving drum.

9. A modular conveyor belt as in claim 1, wherein the link ends or knuckles at the outside edge are essentially squared off at their free ends.

10. A modular conveyor belt as in claim 1, wherein at least one link end at the outside edge of the belt is offset in a space in which it is interdigited, to allow a tight turning radius without binding of link ends of adjacent modules due to angularity of the adjacent module rows.

11. A modular conveyor belt as in claim 1, wherein the turning ratio in the one direction is at least as tight as about 1.6.

12. A modular conveyor belt as in claim 11, wherein the belt has a turning ratio in the opposite direction of curvature in a range of about 2.2 to 3.0.

13. A modular conveyor belt as in claim 12, wherein the turning ratio in the opposite direction of curvature is about 2.5.

14. A modular conveyor belt as in claim 1, wherein an inner link end of said second, slotted link ends has a width which is about 1.5 times as wide as center link ends between the inner and outer link ends.

15. A modular conveyor belt as in claim 14, wherein one of said relatively heavier link ends has a width which is about 2.8 times as wide as the center link ends.

\* \* \* \* \*